Oct. 8, 1935.  P. SARISON  2,016,457
AUTOMATIC TAXIMETER CONTROL
Filed Nov. 15, 1930   3 Sheets-Sheet 1
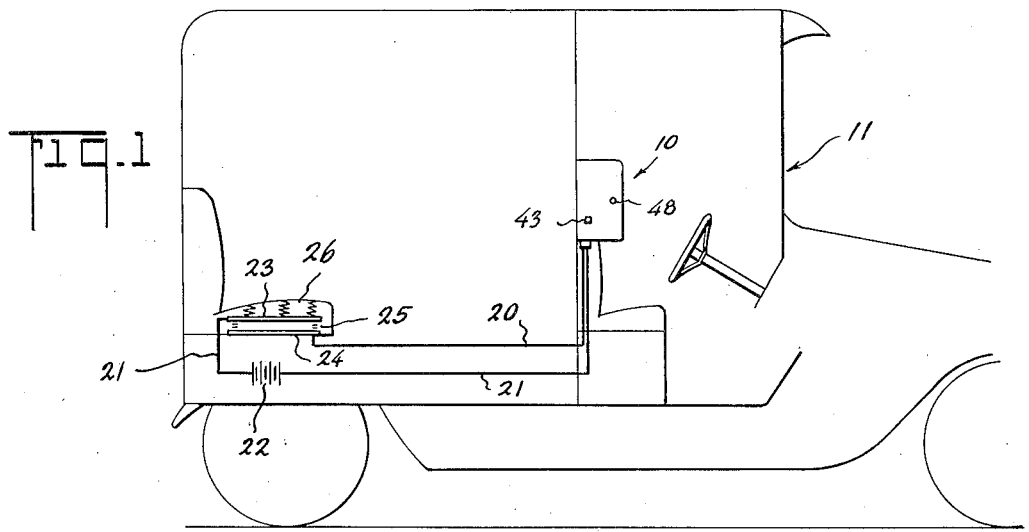
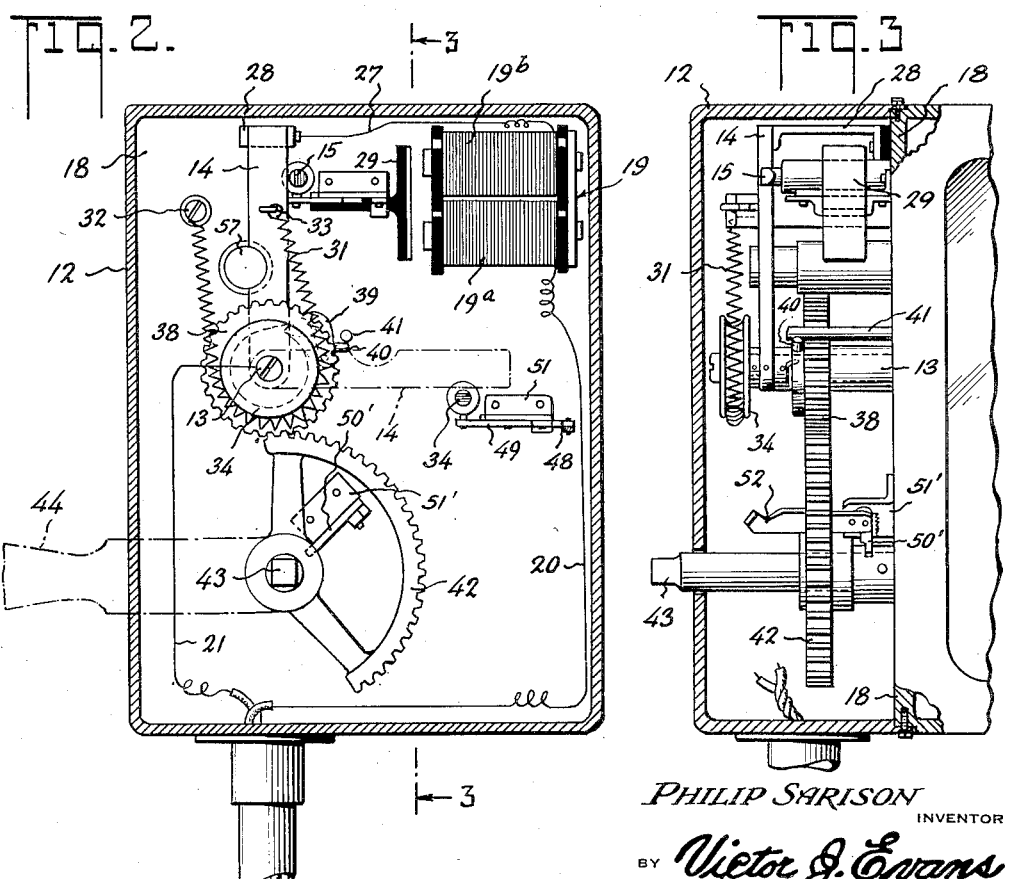
PHILIP SARISON
INVENTOR
BY *Victor J. Evans*
ATTORNEY Oct. 8, 1935.  P. SARISON  2,016,457
AUTOMATIC TAXIMETER CONTROL
Filed Nov. 15, 1930   3 Sheets-Sheet 2
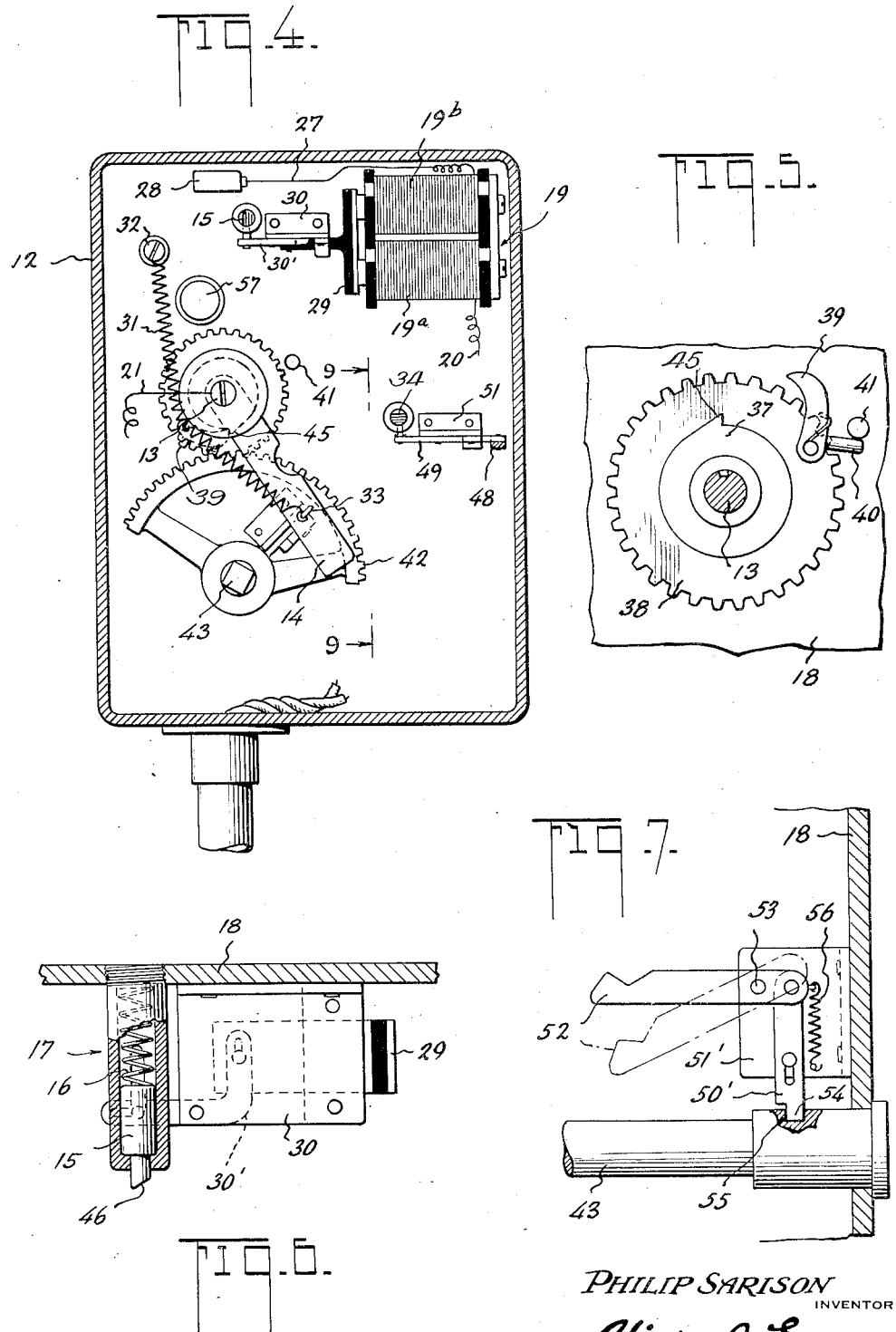
PHILIP SARISON
INVENTOR
BY Victor J. Evans
ATTORNEY
WITNESS:

Oct. 8, 1935.　　　　　P. SARISON　　　　　2,016,457
AUTOMATIC TAXIMETER CONTROL
Filed Nov. 15, 1930　　　3 Sheets-Sheet 3
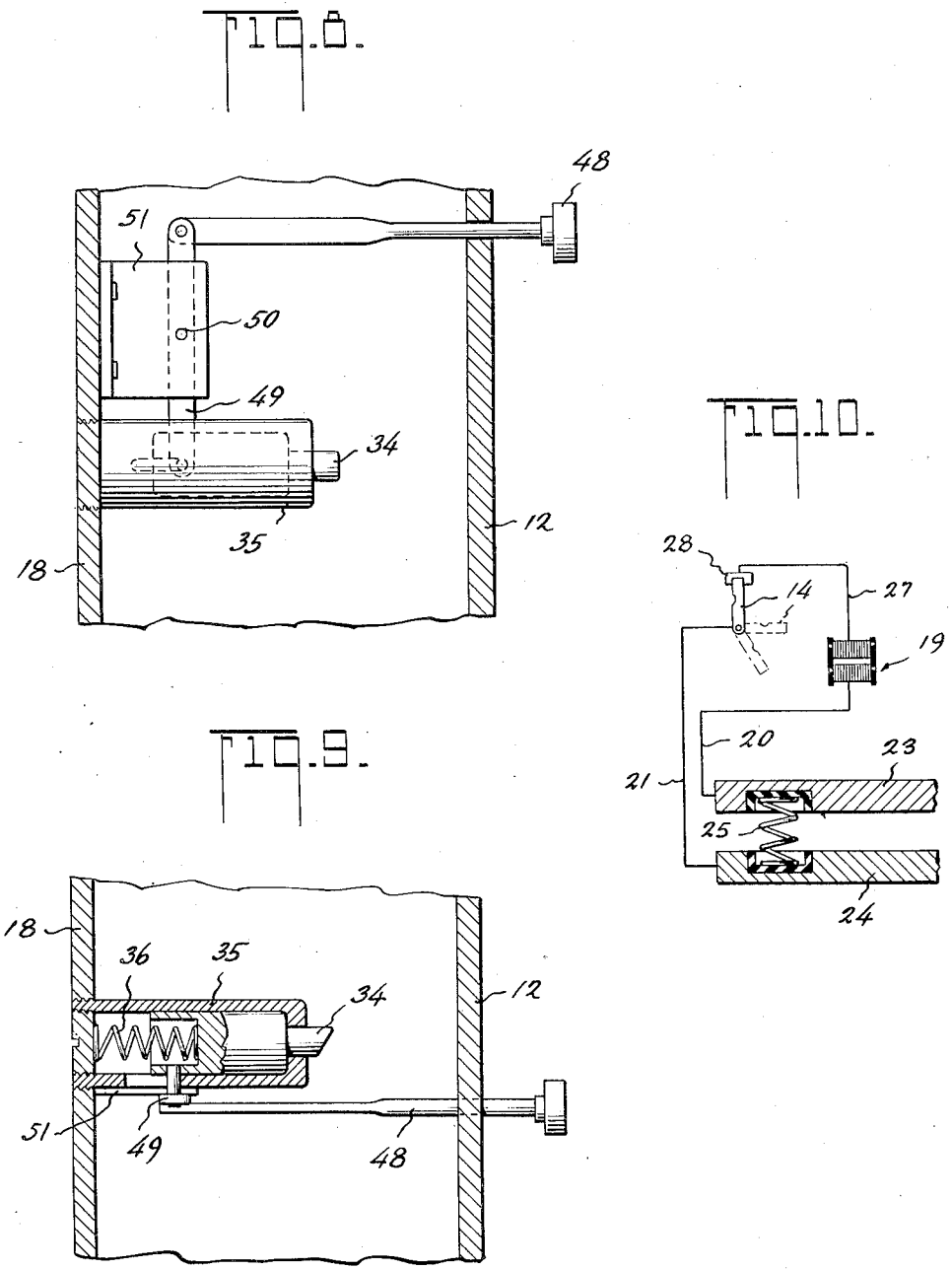
PHILIP SARISON
INVENTOR
BY *Victor J. Evans*
ATTORNEY Patented Oct. 8, 1935

2,016,457

UNITED STATES PATENT OFFICE 2,016,457

AUTOMATIC TAXIMETER CONTROL

Philip Sarison, Brooklyn, N. Y., assignor, by mesne assignments, to Central United National Bank, Cleveland, Ohio, as trustee Application November 15, 1930, Serial No. 495,946

12 Claims. (Cl. 235—30)

This invention relates to taximeters and the like as uset to record the distance traveled, time consumed in travel or time spent in waiting, by taxicab, buses or other passenger conveying vehicles, and more particularly to an automatic control device for such taximeters, whereby the meter is caused to be set in operation automatically without any attention on the part of the operator.

The primary object of the invention is to provide an automatic control means for taximeters and the like whereby the meter will be automatically set in operation by an act of the passenger himself or herself, when entering the vehicle, entirely independently of any act on the part of the chauffeur or operator, whereby among other advantages the chauffeur driver is prevented from conveying the passenger at what is termed a "flat rate", which latter procedure has been a frequently employed method of defrauding the owner of the business in which the vehicle is employed.

Another object of the invention is to provide a taximeter which will be automatically set in operation to record what is termed "time" and "distance" and yet will be capable of being rendered inoperative when the vehicle is stopped through no fault of the passenger, as when making repairs on the road.

Still another object is to provide an automatic taximeter control which will be theft-proof foolproof efficient and positive in its action, durable, and economical in cost of manufacture and installation.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings which latter shows embodiments of the invention as at present preferred.

In said drawings:

Fig. 1 is a diagrammatic side elevation of a motor vehicle equipped with the present automatic meter control.

Fig. 2 is a vertical sectional view through the meter, illustrating the important parts of the automatic control means.

Fig. 3 is a vertical sectional view through the meter substantially on the line 3—3 of Figure 2, looking in the direction of the arrows;

Fig. 4 is a view similar to Figure 2, showing the automatic control means in a different position.

Fig. 5 is a detail top plan view of the control-arm re-setting means;

Fig. 6 is a top plan view of the electromagnetically releasable stop for the controlling arm;

Fig. 7 is a side elevation of the controlling arm stop device associated with the re-setting mechanism.

Fig. 8 is a side elevation of the manually releasable stop for the controlling arm;

Fig. 9 is a side elevation, partly in section of the stop device shown in Figure 8; and Fig. 10 is a diagrammatic view illustrating the automatic electrical means for setting the meter in operation.

The present preferred form of automatic meter controlling means is shown applied to a meter 10 forming part of the equipment of a motor vehicle 11. This meter includes an outer casing 12 which is arranged to house the usual meter mechanism (not shown) as well as the controlling means which constitutes the subject matter of the present invention.

The automatic controlling means in this instance include a main shaft 13, here termed the cam shaft, which controls the meter. Partial rotation of this shaft 13 is adapted to set the taximeter in operation as will be hereinafter described. This shaft 13 has attached thereto a controlling arm 14 which is swingable in a vertical plane to rotate the shaft 13. Means are provided to maintain normally this controlling arm 14 in inoperative or vertical position, and to enable the arm 14 to be automatically released to start the operation of the meter when a passenger enters the vehicle. For this purpose the upper or free end of the arm 14 is adapted to be normally held in the position shown in full lines in Fig. 2, by means of a stop pin 15 which is held against the side of the arm 14 by means of a coiled spring 16 mounted in a casing 17 threaded in the wall 18. The means provided to release automatically the arm 14 and partly rotate the cam shaft 13, to set the meter in operation, in this instance include an electromagnet 19 forming part of an electric circuit which includes wires 20 and 21, a suitable source of electrical energy, as for instance a battery indicated at 22 and a pair of contact plates 23 and 24, normally held separated by insulated springs 25. These contact plates 23 and 24 are here shown associated with the seat cushion 26 of the vehicle, so that the circuit will be closed, as hereinafter described, when the passenger occupies the seat;

but the circuit may also be arranged to be established when the passenger first treads upon the floor of the vehicle, or otherwise.

It will be observed that the circuit wire 20 leads to one pole 19a of the electromagnet 19. The circuit wire 21 terminates at a suitable free connection with the control shaft 13, which latter, being of metal, like the arm 14, causes the arm 14 to form a movable part of the electric circuit, in the nature of a switch, as will hereinafter appear. The opposite pole 19b of the electromagnet has a circuit wire 27 connected to a contact block 28 which is in contact with the arm 14 when the latter is in its normal inoperative position as shown in Fig. 2.

When the above described electric circuit is closed, as for instance when a passenger occupies the seat 26, the electromagnet 19 will be caused to attract an armature 29 which is mounted in a bracket 30 secured to the wall or partition 18. This armature is connected to one arm of a bell crank lever 30', the opposite arm of which is connected to the stop 15, here termed the electrically releasable stop. Thus, when the circuit is closed the stop 15 will be moved inwardly against the tension of the spring 16, and away from the arm 14, thus releasing the arm, which will then be caused to swing to the position shown in dotted lines in Fig. 2 by means of an elongated coiled spring 31, one end of which is secured to the partition 18 as seen at 32, and the opposite end to the arm 14, as seen at 33. The spring 31 in this instance extends around a pulley 34 pinned to the end of the clock shaft 13, thus affording a sufficiently powerful throw for the arm 14 without imposing too much resistance to the spring held stop 15.

The action just described rotates the control shaft 13 so that the meter is set in operation to record time and distance in a conventional way; and the arm comes to rest against the intermediate stop 34 which is mounted in a cylinder 35 and is held in normal operative position by a coiled spring 36. Thus the driver or chauffeur is not required to throw the "flag" or manipulate any lever in order to set the meter in operation, this action being automatic and out of his control.

Now, it may happen that during the trip the driver may be obliged to make a stop for which the passenger is not responsible, such as following an accident, or for repairs, or otherwise. Means are therefore provided to render the clock-work mechanism inoperative. The said means, in this instance include provision for releasing the stop 34 so that the arm 14 may automatically swing down toward the spindle 43, in which position of the arm 14 the recording mechanism will be in non-registering position. This additional arm movement is accomplished by a manual outward movement of a lever 48 which is connected to the stop 34 by means of a link 49 pivotally mounted, as seen at 50 on a bracket 51 secured to the partition 18.

Means are provided to reset the control shaft 13 and arm 14 to the normal inoperative position shown in full lines in Fig. 2, at the conclusion of a trip. For this purpose the shaft 13 has keyed thereto a disk 37 provided with a tooth 45. A gear 38 is loosely mounted on the shaft 13. This gear 38 carries a pawl 39 which has a toe 40 adapted to engage a stop pin 41 and thus prevent the pawl 39 from engaging the ratchet 38 when the arm 14 is in inoperative position. When the electromagnet 19 is energized in the manner already described the arm will be released and will engage the intermediate stop 34. This movement of the arm 14 will not be impeded by the pawl 39.

To re-set the clock-work mechanism I provide in this instance, a toothed sector 42, mounted on a spindle 43 journaled in the partition 18, this spindle having a handle 44 which is located at the outside of the casing 12, this sector 42, having intermeshing engagement with the gear 38. The handle 44 is normally locked against movement by means of a latch device 50' mounted on a bracket 51' secured to the partition 18, this latch device 50' being connected to a releasing member 52 pivotally mounted on the bracket 51' as seen at 53, the latch device 50' having a toe portion 54 which normally rests in a notch 55 provided in the spindle 43 and being held in this position by means of a spring 56 which is effective between the end of the latch device 50' and the bracket 51'. The releasing member 52 extends outwardly within the open portion of the sector 42.

To release the handle 44 it is first necessary to unlatch the member 50' and this is accomplished by operating the lever 48 to release the arm 14 from the intermediate stop 34, whereupon the arm 14 will be swung down, by means of the spring 31, into engagement with the releasing member 52. The handle 44 is then moved downward from the position shown in dotted lines in Fig. 2 to a position as indicated by the position of the sector 42 in Fig. 4. This movement of the sector, will rotate the gear 38 and will carry the pawl 39 down to a position to engage the tooth 45 on the disk 37 as indicated in Fig. 4. The pawl spring will be operative to hold the pawl 39 against the disk 37 during this movement, since the pawl will be released from the stop pin 41. The handle 44 is now swung back to the position shown in dotted lines in Fig. 2, and this will cause the pawl 39 to engage the tooth 45 and rotate the cam shaft 13, to normal position thereby moving the arm 14 upwardly against the tension of the spring 31 until the free end of the arm slides over the inclined surface 46 of the stop 15 and latches in the position shown in full lines in Fig. 2.

As the arm 44 resumes the position shown in dotted lines in Fig. 2 the latch device toe 54 will enter the groove 55 and hold the arm 44 in locked position against manipulation.

The arm 14 normally rests against a limiting stop 57 provided at the upper part of the partition 18, this stop 57 being effective to restrain further movement of the arm 14 immediately after the arm passes over the stop pin 15.

I realize that many changes may be made in the specific form of this invention shown and described by way of illustration in this application and I, therefore, reserve the right to make such changes in the specific form of the invention as shown herein as I may find to be desirable. I, therefore, claim the invention broadly except as I may limit myself by the appended claims.

What I claim is:

1. The combination with a vehicle taximeter control shaft, of a control mechanism including a controlling arm rigidly connected to said shaft, said controlling arm being swingable in an arcuate path, means to actuate said controlling arm, a movable stop to hold said controlling arm normally in inoperative position, electrical means to actuate said stop to permit swinging of said arm and hence to rotate said shaft, said electrical means including a switch device associated with an occupiable portion of said vehicle, a stop to limit the swinging movement of said controlling arm when the latter is released by operation of said electrical means, resetting means for said controlling arm, an operating handle for said resetting means, and means to lock said operating handle normally against manipulation.

2. The combination with a vehicle taximeter control shaft, of a control mechanism including a controlling arm rigidly connected to said shaft, said controlling arm being swingable in an arcuate path, means to actuate said controlling arm, a movable stop to hold said controlling arm normally in inoperative position, electrical means to actuate said stop to permit swinging of said arm and hence to rotate said shaft, said electrical means including a switch device associated with an occupiable portion of said vehicle said arm serving as a means to open a circuit in the electrical means when the arm is moved to its operative position, a stop to limit the swinging movement of said controlling arm when the latter is released by operation of said electrical means, and resetting means for said controlling arm.

3. The combination with a vehicle taximeter control shaft, of a control mechanism including a controlling arm rigidly connected to said shaft, said controlling arm being swingable in an arcuate path, means to actuate said controlling arm, a stop to hold said controlling arm normally in inoperative position, electrical means to actuate said stop to permit swinging of said arm and hence to rotate said shaft, said actuating means including an electromagnet, an armature operatively connected to said electrically releasable stop, a switch device associated with an occupiable portion of said vehicle, an electrical circuit including a source of electric energy and circuit wires connecting said electromagnet and said switch device, said controlling arm forming a part of said electric circuit, said arm serving as a means to open a circuit in the electrical means when the arm is moved to its operative position.

4. The combination with a vehicle taximeter control shaft, of a control mechanism including a controlling arm rigidly connected to said shaft, said controlling arm being swingable in an arcuate path, a coiled spring to actuate said controlling arm, a stop to hold said controlling arm normally in inoperative position, means to actuate said stop to permit swinging of said arm and hence to rotate said shaft to set said taximeter in operation, said actuating means including an electromagnet, an armature operatively connected to said stop, a switch device associated with an occupiable portion of said vehicle, an electrical circuit including a source of electric energy and circuit wires connecting said electromagnet and said switch device, said controlling arm being adapted to form part of said electric circuit, a manually releasable stop to limit the swinging movement of said controlling arm when said electromagnet is energized to release said controlling arm, resetting means for said controlling arm, an operating handle for said resetting means, and a latch device to lock said handle normally against manipulation, said latch device including a releasing member disposed in the arcuate path of said controlling arm and adapted to be engaged by the latter when released by said manually releasable stop.

5. The combination with a vehicle taximeter control shaft, of a control mechanism including a controlling arm rigidly connected to said shaft, said controlling arm being swingable in an arcuate path, a coiled spring to actuate said controlling arm, a stop to hold said controlling arm normally in inoperative position, electrical means to actuate said stop to permit swinging of said arm and hence to rotate said shaft to set said taximeter in operation, said actuating means including an electromagnet, an armature operatively connected to said stop, a switch device associated with an occupiable portion of said vehicle, an electrical circuit including a source of electric energy and circuit wires connecting said electromagnet and said switch device, said controlling arm being adapted to form part of said electric circuit, a manually releasable stop to limit the swinging movement of said controlling arm when said electromagnet is energized to release said controlling arm, and resetting means for said controlling arm, said resetting means including a toothed disk on said shaft, a gear loosely mounted on said shaft, a pawl on said gear to engage said toothed disk, means to hold said pawl normally out of engagement with said toothed disk, a toothed sector engaging said gear, an operating handle connected to said sector.

6. The combination with a vehicle taximeter control shaft, of a control mechanism including a controlling arm rigidly connected to said shaft, said controlling arm being swingable in an arcuate path, a spring to actuate said controlling arm, a stop to hold said controlling arm normally in inoperative position, means to actuate said stop to permit swinging of said arm and hence to rotate said shaft to set said taximeter in operation, said actuating means including an electromagnet, an armature operatively connected to said stop, a switch device associated with an occupiable portion of said vehicle, an electrical circuit including a source of electric energy and circuit wires connecting said electromagnet and said switch device, said controlling arm being adapted to form part of said electric circuit, a manually releasable stop to limit the swinging movement of said controlling arm when said electromagnet is energized to release said controlling arm, and resetting means for said controlling arm.

7. In combination, a passenger controlled switch, a circuit including said switch, a taximeter control shaft, a lever secured to said shaft, said lever forming a part of said circuit and also serving as a means to open the circuit when the lever is moved to its operative position, means whereby when said switch is closed said lever is released, and means to move said lever when released so as to rotate said shaft to its operative position.

8. In combination, a passenger controlled switch, a circuit including said switch, a taximeter control shaft having a plurality of significant positions, a lever secured to said shaft, said lever forming a part of said circuit and also serving as a means to open the circuit when the lever is moved to its operative position, means whereby when said switch is closed said lever is released, and means to move said lever when released so as to rotate said shaft to its first operative position.

9. In combination, a passenger controlled switch, a circuit including said switch, a taximeter control shaft having a plurality of significant positions, a lever secured to said shaft, said lever forming a part of said circuit and also serving as a means to open the circuit when the lever is moved to its operative position, means whereby when said switch is closed said lever is released, means to move said lever when released so as to rotate said shaft to its first operative position, and means to arrest said shaft after it has been moved to its first operative position.

10. In combination, a passenger controlled switch, a circuit including said switch, a taximeter control shaft having a plurality of significant positions, a lever secured to said shaft, said lever forming a part of said circuit, means whereby when said switch is closed said lever is released, means to move said lever when released so as to rotate said shaft to its first operative position, means to arrest said shaft after it has been moved to its first operative position, and means to release the arresting means so that the first mentioned means will move said shaft to its second operative position.

11. In combination, a passenger controlled switch, a circuit including said switch, a taximeter control shaft, a lever secured to said shaft, said lever forming a part of said circuit and also serving as a means to open the circuit when the lever is moved to its operative position, means whereby when said switch is closed said lever is released, means to move said lever when released so as to rotate said shaft to its operative position, and resetting means for said shaft.

12. In combination, a passenger controlled switch, a circuit including said switch, a taximeter control shaft, a lever secured to said shaft, said lever forming a part of said circuit, means whereby when said switch is closed said lever is released, means to move said lever when released so as to rotate said shaft to its operative position, resetting means for said shaft, said resetting means including a gear, means connecting said gear to said shaft, a lever, and a gear secured to said lever and meshing with said first mentioned gear.

PHILIP SARISON.